US011960971B2

(12) United States Patent
Bravyi et al.

(10) Patent No.: US 11,960,971 B2
(45) Date of Patent: *Apr. 16, 2024

(54) QUANTUM READOUT ERROR MITIGATION BY STOCHASTIC MATRIX INVERSION

(71) Applicant: International Business Machines Corporation, Armonk, NY (US)

(72) Inventors: Sergey Bravyi, Yorktown Heights, NY (US); Jay M. Gambetta, Yorktown Heights, NY (US); David C. Mckay, Ossining, NY (US); Sarah E. Sheldon, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,084

(22) Filed: Nov. 18, 2022

(65) Prior Publication Data

US 2024/0005185 A1 Jan. 4, 2024

Related U.S. Application Data

(63) Continuation of application No. 16/791,367, filed on Feb. 14, 2020, now Pat. No. 11,537,927.

(51) Int. Cl.
*G06F 11/00* (2006.01)
*G06F 17/16* (2006.01)
(Continued)

(52) U.S. Cl.
CPC ............. *G06N 10/00* (2019.01); *G06F 17/16* (2013.01); *G06N 7/08* (2013.01)

(58) Field of Classification Search
CPC ........... G06N 10/00; G06N 7/08; G06F 17/16
See application file for complete search history.

(56) References Cited

U.S. PATENT DOCUMENTS 8,484,535 B2 7/2013 Graef et al.
9,762,262 B2 9/2017 Ashikhmin
(Continued)

FOREIGN PATENT DOCUMENTS

CA 3112596 A1 * 4/2020 ............. G06F 17/18
CN 102426342 B * 3/2014
(Continued)

OTHER PUBLICATIONS

Endo, S. et al., "Practical Quantum Error Mitigation for Near-Future Applications", arXiv:1712.09271v2 [quant-ph], May 27, 2018, pp. 1-20.
(Continued)

*Primary Examiner* — Cheng Yuan Tseng
(74) *Attorney, Agent, or Firm* — Amin, Turocy & Watson, LLP

(57) ABSTRACT

A method of mitigating quantum readout errors by stochastic matrix inversion includes performing a plurality of quantum measurements on a plurality of qubits having predetermined plurality of states to obtain a plurality of measurement outputs; selecting a model for a matrix linking the predetermined plurality of states to the plurality of measurement outputs, the model having a plurality of model parameters, wherein a number of the plurality of model parameters grows less than exponentially with a number of the plurality of qubits; training the model parameters to minimize a loss function that compares predictions of the model with the matrix; computing an inverse of the model based on the trained model parameters; and providing the computed inverse of the model to a noise prone quantum readout of the plurality of qubits to obtain a substantially noise free quantum readout.

25 Claims, 2 Drawing Sheets

(51) Int. Cl.
*G06N 7/08* (2006.01)
*G06N 10/00* (2022.01)

(56) References Cited

U.S. PATENT DOCUMENTS

| | | | |
|---|---|---|---|
| 10,332,023 B2 | 6/2019 | Mezzacapo et al. | |
| 10,755,193 B2* | 8/2020 | Kandala | G06N 10/70 |
| 10,956,267 B2* | 3/2021 | Kapit | G06F 11/1076 |
| 11,783,222 B2* | 10/2023 | Wiebe | G06N 5/022 |
| | | | 706/12 |
| 2020/0274554 A1* | 8/2020 | Aspuru-Guzik | G06N 10/00 |

FOREIGN PATENT DOCUMENTS

| | | | | |
|---|---|---|---|---|
| CN | 110471644 A * | 11/2019 | | G06F 7/588 |
| EP | 1 083 520 A2 | 3/2001 | | |
| EP | 1083520 A2 * | 3/2001 | | B82Y 10/00 |

OTHER PUBLICATIONS

Ta-Shma, Amnon "Inverting Well Conditioned Matrices in Quantum Logspace", STOC'13, Jun. 1, 2013, 10 pages.

Fefferman et al., "A Complete Characterization of Unitary Quantum Space", 9th Innovations in Theoretical Computer Science Conference (ITCS 2018), 2018, Article No. 4, p. 4:1-4:21.

Anonymous, "Fit for Purpose Processing in the Quantum World", an IP.com Prior Art Database Technical Dislcosue, IP.com No. IPCOM000255049D, Aug. 28, 2018, 7 pages.

Microsoft et al., "Application of Stochastic Simulation for Real Time Estimation and Optimization of Reliability in Distributed Systems", an IP .com Prior Art Database Technical Disclosure, IP.com No. IPCOM000236552D, May 2, 2014, 4 pages.

Notice of Allowance received for U.S. Appl. No. 16/791,367 dated Aug. 10, 2022, 35 pages.

List of IBM Patents or Applications Treated as Related.

* cited by examiner

QUANTUM READOUT ERROR MITIGATION BY STOCHASTIC MATRIX INVERSION

BACKGROUND

The currently claimed embodiments of the present invention relate to quantum computation, and more specifically, to methods of mitigating quantum readout errors in a quantum computer by stochastic matrix inversion.

Recent experiments indicate that noisy multi-qubit measurements can be well understood in terms of purely classical noise models. For example, an ideal measurement outcome '1' on some qubit can be misread as '0' with a certain probability and vice versa, an ideal measurement outcome '0' on some qubit can also be misread as '1' with a certain probability. In certain cases, cross-talk between qubits results in more complicated correlated readout errors.

Experimentalists describe readout errors by a matrix of transition probabilities A. An element $A_{y,x}$ of the matrix A corresponds to the probability of misreading the ideal measurement outcome x as y. The matrix A can have a size $2^n \times 2^n$ where n is the number of qubits. Conventional readout error mitigation methods consist of a measurement calibration step and a noise inversion step. The calibration probes the noise on each input basis vector and provides an empirical estimate of the noise matrix A. A noise inversion step applies the inverse matrix $A^{-1}$ to the observed measurement outcomes expressed as a probability vector.

Error mitigation enables high-precision estimation of mean values of observables, for example in the context of variational quantum algorithms or multi-qubit tomography. In addition, in contrast to quantum error correction, error mitigation does not introduce overhead in terms of extra qubits or gates. The only overhead results from the need to repeat the experiment many times which can be performed on quantum devices. However, this approach is not applicable to single-shot measurements. In addition, full measurement calibration may use at least $2^n$ experiments to probe the noise on each basis vector. However, due to limits in classical memory and runtime required to apply the inverse A-matrix which grows as $2^0(n)$, this approach may not be scalable to large matrices A. As a result, determining the matrix A and inverting the matrix A may not be efficient for a relatively large number of qubits (e.g., greater than 20 qubits).

SUMMARY

An aspect of the present invention is to provide a method of mitigating quantum readout errors by stochastic matrix inversion. The method includes performing a plurality of quantum measurements on a plurality of qubits having predetermined plurality of states to obtain a plurality of measurement outputs; selecting a model for a matrix linking the predetermined plurality of states to the plurality of measurement outputs, the model having a plurality of model parameters, wherein a number of the plurality of model parameters grows less than exponentially with a number of the plurality of qubits; training the plurality of model parameters to minimize a loss function that compares predictions of the model with the matrix; computing an inverse of the model representing an inverse of the matrix based on the trained model parameters; and providing the computed inverse of the model to a noise prone quantum readout of the plurality of qubits to obtain a substantially noise free quantum readout.

In an embodiment, selecting the model includes selecting a Tensor Product (TP) noise model, and the plurality of model parameters include error rates of independent transitions from state 0 to state 1 and probabilities of independent transitions from state 1 to state 0. In an embodiment, the model for the matrix is such that the matrix is a product of a plurality of qubit matrices, each qubit matrix representing a state of a given qubit j in the plurality of qubits, the matrix being expressed as:

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix},$$

wherein $\epsilon_j$ are error rates describing transition from state 0 to state 1 for qubit j (j=1 ... n), and
wherein $\eta_j$(j=1 ... n) are error rates describing transition from state 1 to state 0 for qubit j (j=1 ... n).

In an embodiment, selecting the model includes selecting a Continuous Time Markov Process (CTMP) noise model, and the plurality of model parameters include atomic generator elements $G_i$ and transition rates $r_i$, where i represents a qubit i in the plurality of qubits. In an embodiment, the model for the matrix A is such that $A = \exp(G)$ wherein model parameter generator matrix G is equal to a sum of products of atomic generator elements $G_i$ by transition time-independent rates $r_i$ over all qubits i as follows:

$$G = \sum_i G_i r_i.$$

In an embodiment, the model approximates the matrix as an exponential of a model parameter generator matrix G, wherein the model parameter generator matrix G is equal to a sum of products of atomic generator elements $G_i$ by transition time-independent rates $r_i$ over all qubits i; the atomic generator elements $G_i$ of the model parameter generator matrix G generates a transition from a bit string $a_i$ to another bit string $b_i$ on a subset of bits $C_i$, wherein $a_i$ and $b_i$ are either state 0 or state 1 of qubit i. In an embodiment, the inverse of the model representing the inverse of the matrix based on the trained model parameters includes computing the exponential of negative model parameter generator matrix G.

In an embodiment, the number of the plurality of model parameters grows linearly with the number of the plurality of states.

In an embodiment, providing the computed inverse of the model to the noise prone quantum readout of the plurality of qubits comprises applying the computed inverse of the model to the noise prone quantum readout of the plurality of qubits to substantially correct the noise prone quantum readout so as to substantially remove noise in the noise prone quantum readout.

In an embodiment, the method further includes constructing the matrix, the matrix having a plurality of matrix elements, each element of the matrix associates each of the pre determined states of the plurality of qubits with a corresponding each of the plurality of measurement outputs. In an embodiment, the number of the plurality of model parameters grows less than a growth of a number of the plurality of matrix elements.

In an embodiment, training the plurality of model parameters to minimize a loss function that compares predictions of the model with the matrix comprises finding the plurality of model parameters that substantially fit the matrix.

Another aspect of the present invention is to provide a computer readable medium on which is stored non-transitory computer-executable code, which when executed by a classical computer causes a quantum computer to: perform a plurality of quantum measurements on plurality of qubits having predetermined plurality of states to obtain a plurality of measurement outputs; select a model for a matrix linking the predetermined plurality of states to the plurality of measurement outputs, the model having a plurality of model parameters, wherein a number of the plurality of model parameters grows less than exponentially with a number of the plurality of states; train the plurality of model parameters to minimize a loss function that compares predictions of the model with the matrix; compute an inverse of the model representing an inverse of the matrix based on the trained model parameters; and apply the computed inverse of the model to a noise prone quantum readout of the plurality of qubits of the quantum computer to obtain a substantially noise free quantum readout from the quantum computer.

A further aspect of the present invention is to provide a classical computer configured to execute a non-transitory computer-executable code, the code when executed by the classical computer causes a quantum computer to: perform a plurality of quantum measurements on plurality of qubits having predetermined plurality of states to obtain a plurality of measurement outputs; select a model for a matrix linking the predetermined plurality of states to the plurality of measurement outputs, the model having a plurality of model parameters, wherein a number of the plurality of model parameters grows less than exponentially with a number of the plurality of states; train the plurality of model parameters to minimize a loss function that compares predictions of the model with the matrix; compute an inverse of the model representing an inverse of the matrix based on the trained model parameters; and apply the computed inverse of the model to a noise prone quantum readout of the plurality of qubits of the quantum computer to obtain a substantially noise free quantum readout from the quantum computer.

By using the above methods and computer code, computational cost of applying the inverse A-matrix is reduced from $2^{0(n)}$ to $2^{\varepsilon n}$. Here $\varepsilon \ll 1$ is the readout error rate quantified below. Classical memory footprint is substantially reduced from $2^0(n)$ to $0(n)$. While the runtime scaling may still be exponential, the constant in the exponent is reduced dramatically enabling demonstrations on a device with a plurality of qubits (e.g., 20 or more qubits). The stochastic matrix inversion algorithm described sidesteps computing the inverse A-matrix explicitly.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
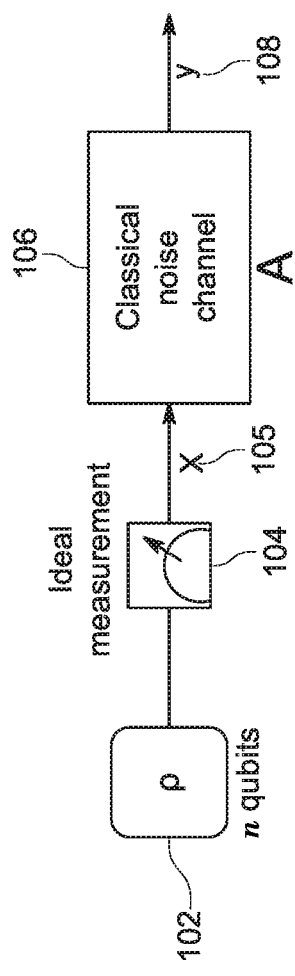
FIG. 1 is a schematic representation of a classical noise channel introducing noise to an ideal measurement of a state of n qubits, according to an embodiment of the present invention.

FIG. 1 is a schematic representation of a classical noise channel introducing noise to an ideal measurement of a state of a plurality of qubits n, according to an embodiment of the present invention. For example, FIG. 1 shows that an ideal measurement outcome 'x' 105 on some qubit (having a qubit state p) 102 in the plurality of qubits n can be misread as readout 'y' 108, when performing measurement 104. The readout errors in the plurality of qubits n due to a classical noise channel 106 can be described by transition probabilities matrix A. Each element $A_{y,x}$ in the matrix A corresponds to the probability of misreading the ideal measurement outcome 'x' 105 as 'y' 108. The matrix A can have a size $2^n \times 2^n$ where n is the number of the plurality of qubits 102.

In order to mitigate quantum readout errors in a quantum mechanical computer (quantum computer), there is provided a method that is based on stochastic matrix inversion. Instead of computing the inverse of the matrix A explicitly which is computer intensive and can be inefficient, the present method, according to an embodiment of the present invention, uses a combination of model fitting and stochastic matrix inversion methods. The model is efficiently inversed without requiring large computing resources contrary to classical or conventional matrix inversion techniques.

Figure 2:
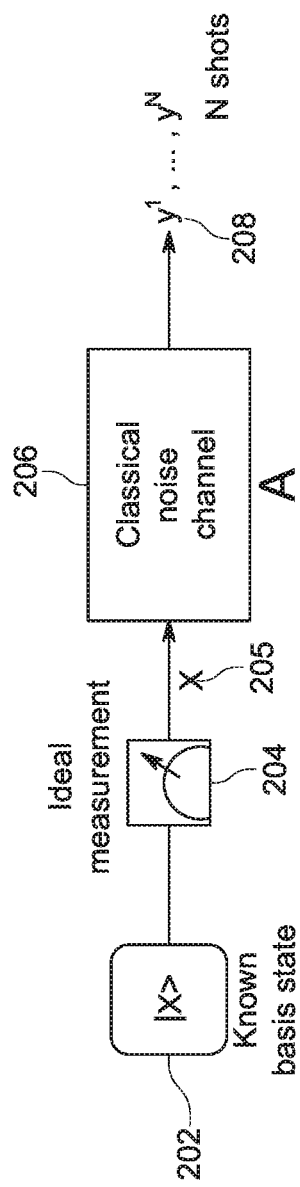
FIG. 2 is a schematic representation of a classical noise channel introducing noise to an ideal measurement of a known basis state, according to an embodiment of the present invention.
Figure 3:
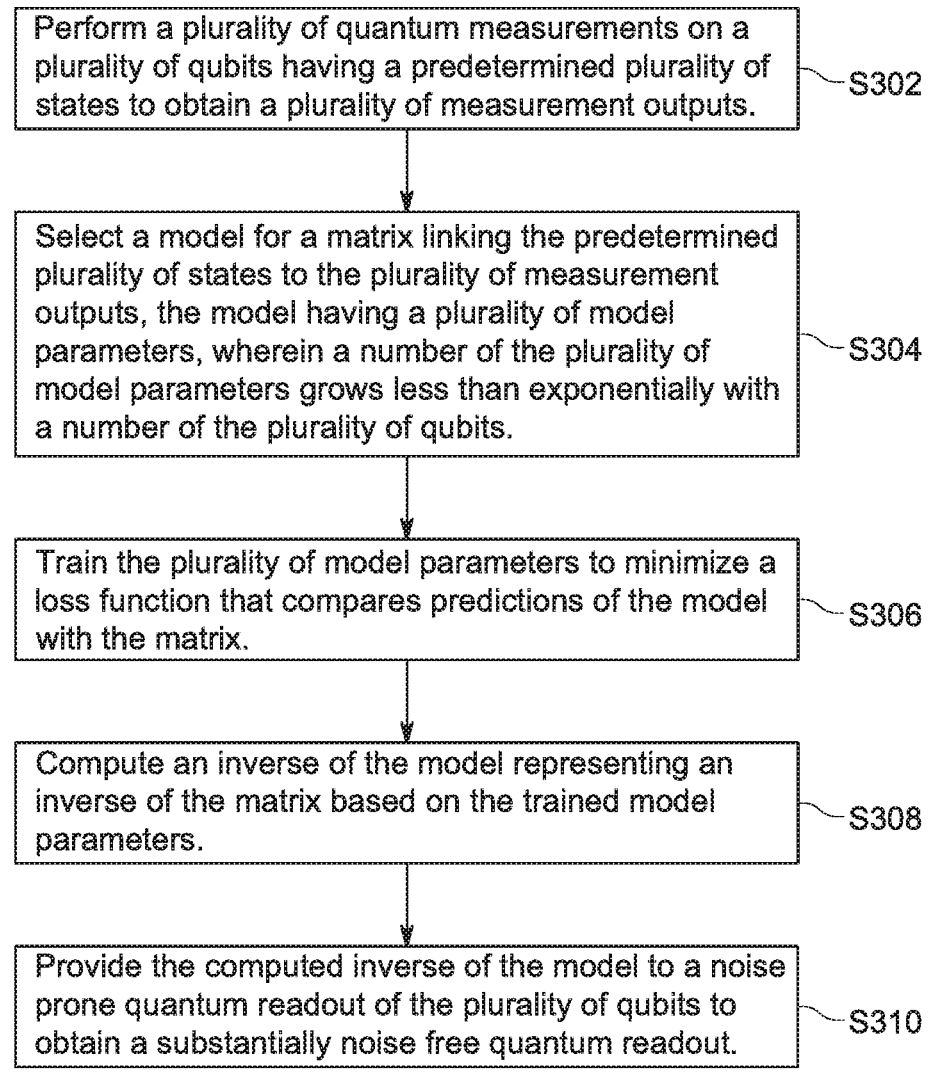
FIG. 3 is a flow chart of a method of mitigating quantum readout errors by stochastic matrix inversion on a quantum computer, according to an embodiment of the present invention.

FIG. 2 is a schematic representation of a classical noise channel introducing noise to an ideal measurement of a known basis state, according to an embodiment of the present invention. FIG. 3 is a flow chart of a method of mitigating quantum readout errors by stochastic matrix inversion on a quantum computer, according to an embodiment of the present invention. As shown in FIG. 2 and FIG. 3, the method of mitigating quantum readout errors by stochastic matrix inversion includes performing a plurality of quantum measurements (N shots) 204 on a plurality of qubits (having predetermined plurality of states ($x^1$, $x^2$, ..., $y^K$) 202 to obtain a plurality of measurement outputs $y^1$, $y^2$, ..., $y^N$ 208 for each qubit state 202, at S302. An ideal measurement outcome 'x' 205 on some qubit (having a qubit state) 202 in the plurality qubits n can be misread as readout 'y' 208, when performing measurement 204 due to the presence of classical noise channel 206.

A "shot" corresponds to preparing a state of a qubit and then performing a quantum measurement of the state of the qubit. Therefore, a plurality of shots corresponds to a plurality of quantum measurements of the state of a qubit. For example, a qubit having a state (input) known to be 0 (e.g., ground state) can be measured and readout (output) as 0 or 1 in a plurality of measurements N because of the presence of the classical noise 206. For example, in N quantum measurements or shots, some measurements of the state 0 can be readout as 0 (i.e., without introduction of an error) while some other measurements of the state 0 can be readout as 1 (i.e., with an introduction of an error).

Table 1 shows that a qubit state $x^1$ can be readout as $y^{1,1}$ for shot 1, $y^{1,2}$ for shot 2, ... $y^{1,N}$ for shot N. Similarly, qubit state $x^2$ can be readout as $y^{2,1}$ for shot 1, $y^{2,2}$ for shot 2, ..., $y^{2,N}$ for shot N. Qubit state $x^K$ can be readout as $y^{K,1}$ for shot 1, $y^{K,2}$ for shot 2, ..., $y^{K,N}$ for shot N.

TABLE 1

| INPUTS | OUTPUTS |
|---|---|
| $x^1$ | $y^{1,1}, y^{1,2}, \ldots, y^{1,N}$ |
| $x^2$ | $y^{2,1}, y^{2,2}, \ldots, y^{2,N}$ |
| ... | ... |
| $x^K$ | $y^{K,1}, y^{K,2}, \ldots, y^{K,N}$ |

Therefore, there exists a matrix A that links the various inputs or predetermined qubit states $x^1, x^2, \ldots, x^K$ to the various outputs as shown in Table 1.

As shown in FIG. 3, the method includes selecting a model for the matrix linking the predetermined plurality of states to the plurality of measurement outputs, at S304. The model has a plurality of model parameters. A number of the plurality of model parameters grows less than exponentially with a number of the plurality of qubits. In an embodiment, the number of the plurality of model parameters grows linearly with the number of the plurality of qubits. For example, if the number of qubits is equal to n, the number of the plurality of model parameters grows linearly with the number n. If n grows from 2 to 10 qubits, for example, the number of parameters also grows linearly from 2 to 10. On the other hand, as illustrated in FIG. 2, the matrix A itself linking the predetermined states 202 to the various outputs or readouts 208 would grow exponentially as $2^n \times 2^n$. That is, in this example, the matrix A would grow exponentially from $2^2 \times 2^2$ (i.e., 4×4) to $2^{10} \times 2^{10}$. This would render computing the inverted matrix A computer intensive or even prohibitive for a very large number of qubits (e.g., 10 or more) and thus qubit states 202, such as for example hundreds, thousands, or more.

In an embodiment, the method may also include constructing the matrix A, the matrix A having a plurality of matrix elements. Each element of the matrix A associates each of the pre-determined states of the plurality of qubits with a corresponding each of the plurality of measurement outputs. In an embodiment, the number of the plurality of model parameters grows less than a growth of a number of the elements of the matrix. For example, if the number of elements of the matrix grows as $2^n \times 2^n$, where n is the number of qubits, the number of the plurality of model parameters only grows linearly with the number n of qubits and thus less than exponentially.

As shown in FIG. 3, the present method also includes training the plurality of model parameters to minimize a loss function that compares predictions of the model with the matrix, at S306. In an embodiment, training the plurality of model parameters to minimize a loss function that compares predictions of the model with the matrix includes finding the plurality of model parameters that substantially reproduce, simulate or fit the matrix A.

In an embodiment, selecting the model includes selecting a Tensor Product (TP) noise model. The plurality of model parameters includes error rates of independent transitions from state 0 to state 1 and probabilities of independent transitions from state 1 to state 0. In an embodiment, the model for the matrix A is such that the matrix A is a product of a plurality of qubit matrices, each qubit matrix represents a state of a given qubit j in the plurality of qubits n. In an embodiment, the matrix A can be expressed mathematically as follows:

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix},$$

wherein $\epsilon_j$ are error rates describing a transition from state 0 to state 1 for qubit j (j=1 ... n), and wherein $\eta_j$(j=1 ... n) are error rates describing a transition from state 1 to state 0 for qubit j (j=1 ... n).

In another embodiment, selecting the model includes selecting a Continuous Time Markov Process (CTMP) noise model. In this case, the plurality of model parameters includes atomic generator elements $G_i$ and transition rates $r_i$, where i represents a qubit i in the plurality of qubits. The Markov chain described by the A-matrix can be efficiently simulated classically using the Gillespie algorithm, for example.

In an embodiment, the model for the matrix A can be expressed as the exponential of model parameter generator matrix G such that $A=\exp(G)$.

The model parameter generator matrix G is equal to a sum of products of atomic generator elements $G_i$ by transition time-independent rates $r_i$ over all qubits i as follows:

$$G = \sum_i G_i r_i.$$

In this case, the parameters $G_i$ and $r_i$ are stored in order to calculate the model parameter generator matrix G instead of storing all the elements of the matrix A.

In an embodiment, the atomic generator elements $G_i$ include, for example: element $G_1$ corresponding to a transition from state 0 to state 1 of a first qubit (Q1) in the plurality qubits, element $G_2$ corresponding to a transition from state 1 to state 0 of the first qubit (Q1) in the plurality of qubits, element $G_3$ corresponding to a transition from state 0 to state 1 of a second qubit (Q2) in the plurality of qubits, and element $G_4$ corresponding to a transition from state 1 to state 0 of the second qubit (Q2) in the plurality of qubits. In an embodiment, the atomic generator elements $G_i$ may further include, for example: element $G_5$ corresponding to transition from state 01 to state 11 of neighboring first and second qubits (Q1, Q2), and element $G_6$ corresponding to a transition from state 10 to state 11 of the neighboring first and second qubits (Q1, Q2). The elements $G_1 \ldots G_6$ can be written as shown in Table 2.

TABLE 2

| 0 → 1 (Q1) | $G_1 = |11\rangle\langle 01| - |01\rangle\langle 01| \otimes I$ |
| 1 → 0 (Q1) | $G_2 = |10\rangle\langle 11| - |11\rangle\langle 11| \otimes I$ |
| 0 → 1 (Q2) | $G_3 = I \otimes (|11\rangle\langle 01| - |01\rangle\langle 01|)$ |
| 1 → 0 (Q2) | $G_4 = I \otimes (|10\rangle\langle 11| - |11\rangle\langle 11|)$ |
| 01 → 11 (Q1, Q2) | $G_5 = |11\rangle\langle 01| - |01\rangle\langle 01|$ |
| 10 → 11 (Q1, Q2) | $G_6 = |11\rangle\langle 10| - |10\rangle\langle 10|$ |

In this example, the model parameter generator matrix G can be written as the sum of the products $r_i G_i$ as follows:

$G=r_1G_1+r_2G_2+\ldots+r_6G_6$

The model captures correlated readout errors. A good agreement is found with the experimental data for the CTMP model that only includes atomic transitions for nearest-neighbor pairs of qubits (first qubit Q1 and second qubit Q2) on the device connectivity graph. Such model contains only $O(\eta)$ atomic generator elements.

Therefore, in an embodiment, the model approximates the matrix A as an exponential of model parameter generator matrix G. The model parameter generator matrix G is equal to a sum of products of atomic generator elements $G_i$ by transition time-independent rates $r_i$ over all qubits i. The atomic generator elements $G_i$ of the model parameter generator matrix G generate a transition from a bit string $a_i$ to another bit string $b_i$ on a subset of bits $C_i$, wherein $a_i$ and $b_i$ are either state 0 or state 1 of qubit i.

As shown in FIG. 3, the method also includes computing an inverse of the model that represents an inverse of the matrix based on the trained model parameters, at S308. For example, in the case of the Continuous Time Markov Process (CTMP) noise model, computing the inverse of the model representing the inverse of the matrix based on the trained model parameters includes computing the exponential of negative model parameter generator matrix G, as follows:

$$A^{-1} = \exp(-G)$$

This enables efficient implementation of the noise inversion step as the inversion simply puts a negative sign on the model parameter generator matrix G.

As shown in FIG. 3, the method also includes providing the computed inverse of the model to a noise prone quantum readout of the plurality of qubits to obtain a substantially noise free quantum readout, at S310. In an embodiment, providing the computed inverse of the model to the noise prone quantum readout of the plurality of qubits includes applying the computed inverse of the model to the noise prone quantum readout of the plurality of qubits to substantially correct the noise prone quantum readout so as to substantially remove noise in the noise prone quantum readout.

In an embodiment, the term "substantially noise free" can be defined to mean noise levels that are low enough to produce an error rate less than 1%, for example. In another embodiment, the term "substantially noise free" can be defined to mean noise levels that are low enough to produce an error rate less than 0.5%, for example. In yet another embodiment, the term "substantially noise free" can be defined to mean noise levels that are low enough to produce an error rate less than 0.1%, for example. A tolerance of a specific error rate (less than 1%, less than 0.5%, less than 0.1%, etc. . . . ) can depend on the model used.

In an embodiment, the above method can be used for mitigating measurement errors for a certain class of quantum algorithms, where measurement outcomes are used for computing mean values of observables. Notable examples of such algorithms are variational quantum eigensolvers, quantum machine learning, and tomography of entangled states.

As it can be understood from the above paragraphs, in an embodiment, the method includes three basic steps: noise model selection, measurement calibration, and noise inversion. The model selection step aims at identifying and parameterizing dominant noise processes in a given n-qubit device. In an embodiment, the Tensor Product (TP) model can be used. In another embodiment, a Markovian noise model can be used instead. Both types of models depend on $O(n)$ parameters. Whereas, the full A-matrix model requires $4^n$ parameters.

The measurement calibration step aims at learning the unknown parameters of the noise model. As described in the above paragraphs, this is achieved by preparing a set of well-characterized input states (e.g. the standard basis vectors) and repeatedly performing n-qubit measurements on each input state. The calibration dataset is then used to train the noise model.

Finally, the noise inversion step aims at simulating the ideal n-qubit measurement. This is achieved by applying the inverse of the noise channel to the observed measurement data. The noise models described herein enable efficient implementation of all above steps. The overhead introduced by the error mitigation, including the number of experiments and the cost of classical processing, scales as $2^{O(\epsilon n)}$, where $\epsilon$ is the noise rate. One benefit of the method described herein according to an embodiment of the present invention is that the method does not require any modifications at the hardware level. The improved measurement fidelity is achieved by a post-processing of the measured outcomes.

UNBIASED ERROR MITIGATION: In an embodiment, we consider $\rho$ to be the output state of a (noisy) quantum circuit acting on $\eta$ qubits. It is possible to measure an expected value of a given observable o on the state $\rho$ within a specified precision $\delta$. For simplicity, below we assume that the observable o is diagonal in the standard basis and takes values in the interval $[-1, 1]$ which can be expressed mathematically by the following equation.

$$O = \sum_{x \in \{0,1\}^n} O(x)|x\rangle, \, |O(x)| \le 1.$$

Considering M independent experiments (i.e., shots) where each experiment (i.e., shot) prepares the state $\rho$ and then measures each qubit in the standard basis. If $s^i \in \{0, 1\}^n$ is a string of measurement outcomes observed in the i-th experiment, in the absence of measurement errors one can approximate the mean value $\mathrm{Tr}(\rho o)$ by an empirical mean value as follows:

$$\mu = M^{-1} \sum_{i=1}^{M} O(s^i). \tag{1}$$

Using Hoeffding's inequality, we obtain $|\mu - \mathrm{Tr}(\rho o)| \le \delta$ with high probability (at least ⅔) if we choose $M = 4\delta^{-2}$. $\mu$ is an unbiased estimator of $\mathrm{Tr}(\rho o)$.

If we assume that the measurements are noisy, the general model of a noisy n-qubit measurement involves a Positive Operator Value Measure (POVM) with $2^n$ elements $\{\pi_x\}$ labeled by n-bit strings x. The probability of observing a measurement outcome x is given by $P(x) = \mathrm{Tr}(\rho \pi_x)$. In the ideal case one has $\pi_x = |x\rangle\langle x|$ while in the presence of noise $\pi_x$ can be arbitrary positive semi-definite operators that obey the normalization condition $\sum_x \pi_x = I$. To enable efficient error mitigation, a simplifying assumption can be made that all POVM elements $\pi_x$ are diagonal in the standard basis. Then one can write $\pi_x$ as follows:

$$\Pi_x = \sum_y \langle x|A|y\rangle \, |y\rangle\langle y|$$

for some stochastic matrix A of size $2^n$. In other words, (x A|y) corresponds to the probability of observing an outcome x provided that the true outcome is y. In this section, it can be assumed that the matrix A is known. By analogy with Equation (1), an error-mitigated empirical mean value can be defined as:

$$\xi = M^{-1} \sum_{i=1}^{M} \sum_{x} O(x) \langle x | A^{-1} | s^i \rangle. \quad (2)$$

The random variable $\xi$ is an unbiased estimator of $\text{Tr}(\rho o)$ with the standard deviation $\sigma_\xi \leq \Gamma M^{-1/2}$, where $$\Gamma = \max_{y} \sum_{x} |\langle x | A^{-1} | y \rangle|. \quad (3)$$

By Hoeffding's inequality, $|\xi - \text{Tr}(\bar\rho o)| \leq \delta$ with high probability (at least 2/3) if we choose $$M = 4\delta^{-2} \Gamma^2 \quad (4)$$

This determines the number of shots that is sufficient to achieve the desired precision $\delta$. Since $M \sim \delta^{-2}$ in the ideal case, the quantity $\Gamma^2$ can be viewed as an error mitigation overhead.

TENSOR PRODUCT NOISE: In an embodiment, a simple case when A is a tensor product of 2×2 stochastic matrices can be considered, as described in the above paragraphs.

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix}. \quad (5)$$

As described in the above paragraphs, $\epsilon_j$ and $\eta_j$ are error rates describing transitions $0 \to 1$ and $1 \to 0$ respectively. In an embodiment, a calculation provides the following result.

$$\Gamma = \prod_{j=1}^{n} \frac{1 + |\epsilon_j - \eta_j|}{1 - \epsilon_j - \eta_j}. \quad (6)$$

In this case, we assume for simplicity that $\epsilon_j, \eta_j \leq 1/2$. As described in the above paragraphs and further in detail in the following paragraphs, the error rates $\epsilon_j, \eta_j$ if can be estimated by calibrating the measurement. Hence, equations (4,6) can be used to determine the number of shots for a given precision $\delta$. For example, if all error rates are the same, $\epsilon_j = \eta_j = \epsilon \ll 1$, one has $\Gamma \approx e^{4\epsilon n}$. The error mitigation overhead scales as $\Gamma^2 \approx e^{4\epsilon n}$.

In an embodiment, the error-mitigated mean value $\xi$ can be computed efficiently in the special case when the observable o has a tensor product form, $o = o1 \otimes \ldots \otimes o_n$. For example, o can be a product of Pauli Z operators on some subset of qubits. Alternatively, o can project some subset of qubits onto 0 or 1 states. From equations (2,5) the following equation (7) can be obtained.

$$\xi = M^{-1} \sum_{i=1}^{M} \prod_{j=1}^{n} \langle + | O_j \begin{bmatrix} 1-\epsilon_j & \eta_j \\ \epsilon_j & 1-\eta_j \end{bmatrix}^{-1} | s_j \rangle. \quad (7)$$

Where $|+\rangle = |0\rangle + |1\rangle$ and $s_j^i$ is the j-th bit of $s^i$. The i-th term in Equation (7) involves n inner products between single-qubit states. Therefore, one can compute $\xi$ in time roughly nM. The post-processing runtime is linear in the number of qubits and the number of shots. In the following section (Correlated Noise) we provide an efficient algorithm for approximating the mitigated mean value $\xi$ for an arbitrary observable o. The algorithm has runtime roughly $nM\delta^{-2}$, where $\delta$ is the desired precision. It is assumed that o(x) can be computed in unit time for any given x.

CORRELATED NOISE: Although the Tensor Product noise model is easy to analyze, it may leave aside cross-talk errors encountered in real-world setups. For small enough number of qubits, the full noise matrix A can be estimated from the experimental data. However, since the full matrix A depends on roughly $4^n$ parameters, this method quickly becomes impractical. Instead, the noise matrix A is fitted with a model that depends only on poly(n) parameters. A good noise model is expressive enough to capture cross-talk errors in real devices. At the same time, the model should be sufficiently simple such that the error-mitigated mean value $\xi$ defined in Equation (2) can be computed efficiently.

Alternatively, or in addition, as described in the above paragraphs, the noise matrix A can be modeled by a Continuous Time Markov Process (CTMP) model where each step generates a transition on a small subset of bits. As defined previously the matrix A can be expressed as follows:

$$A = e^G, \quad G = \sum_{i=1}^{w} r_i G_i \quad (8)$$

where $e^G$ is the matrix exponential, $r_i \geq 0$ are transition rates, and $G_i$ generates a transition from a bit string $a^i$ to another string $b^i$ on a certain subset of bits $C_i$, $$G_i = |b^i\rangle \langle a^i| - |a^i\rangle \langle a^i|)_{C_i} \otimes I_{else} \quad (9)$$

Wherein $C_i \subseteq [\eta]$, $a^i, b^i \in \{0,1\}^{|C_i|}$, and $I_{else}$ is the identity operator acting on all qubits $j \notin C_i$. As stated above, the operators $G_i$ are referred to as atomic generators. One can easily verify that equation (8) defines an invertible stochastic matrix. The inverse of A can be computed analytically: $A^{-1} = e^{-G}$. The CTMP noise model can be efficiently simulated using the Gillespie algorithm. It takes as input a basis state x and returns a sample from the probability distribution $A|x\rangle$.

The Tensor Product noise model in equation (5) can also be easily expressed as a CTMP using the following identity:

$$\begin{bmatrix} 1-\epsilon & \eta \\ \epsilon & 1-\eta \end{bmatrix} = e^G, \quad G = -\frac{\log(1-\epsilon-\eta)}{\epsilon+\eta} \begin{bmatrix} -\epsilon & \eta \\ \epsilon & -\eta \end{bmatrix}.$$

Where we assume that $\epsilon + \eta < 1$ and use the natural logarithm. Therefore, G includes two atomic transitions $1 \to 0$ and $0 \to 1$ with suitable rates. In an embodiment, a choice of the atomic generators $G_i$ can be hardware dependent. For example, for platforms based on transmon qubits, it is natural to allow two-qubit transitions only for pairs of nearest-neighbor qubits that are coupled by a microwave resonator. If (i, j) is a pair of nearest-neighbor qubits, we allow all possible atomic transitions that involve the pair of bits i, j, namely, $00 \to 01, 00 \to 10, 00 \to 11, 01 \to 00, 01 \to 10, 01 \to 11$, etc. Thus, if the qubit connectivity graph has m edges, the total number of atomic transitions is $w = 12m$. The rate $r_i$ of each transition is determined from the measurement calibration data.

In the following paragraphs, we show how to compute the error-mitigated mean value $\xi$ defined in equation (2). Since $\xi$ itself is only a $\delta$-estimate of the true mean value $\text{Tr}(\rho o)$, it suffices to approximate $\xi$ within an error $\approx \delta$. Our approximation algorithm is based on the following. If we suppose A is an invertible stochastic matrix, there exist stochastic matrices $S_a$ and real coefficients $c_a$ such that:

$$\|c\|_1 \equiv \sum_\alpha |c_\alpha| = \Gamma \text{ and} \qquad (10)$$

$$A^{-1} = \sum_\alpha c_\alpha S_\alpha.$$

Furthermore, $\|c\|_1 \geq \Gamma$ for any decomposition as above. $\Gamma$ is the quantity defined in equation (3). The following algorithm can be used for approximating the error-mitigated mean value $\xi$.

---
Algorithm 1: Stochastic Matrix Inversion
---
$T \leftarrow 4\delta^{-2}\|c\|_1^2$
for t = 1 to T do
    sample i ∈ [M] uniformly at random
    sample α from the distribution $q_\alpha = |c_\alpha|/\|c\|_1$
    sample x from the distribution $(x|S_\alpha|s^i)$
    $\zeta_t \leftarrow \text{sgn}(c_\alpha)O(x)$
end for
return $\eta = T^{-1}\|c\|_1 \Sigma_{t=1}^T \zeta_t$

---

In algorithm 1, $c_a$, $S_a$ are defined above. In an embodiment, the output of this algorithm satisfies $|\eta-\xi| \leq \delta$ with high probability (at least ⅔). Indeed, substituting equation (10) into equation (2) we obtain the following equation (11).

$$\xi = M^{-1}\|c\|_1 \sum_{i=1}^{M}\sum_\alpha \sum_x q_\alpha \text{sgn}(c_\alpha)O(x)\langle x|S_\alpha|s^i\rangle. \qquad (11)$$

That is $$\xi = \|c\|_1 \mathbb{E}_{i,\alpha,r} \text{sgn}(c_\alpha)o(x(i,\alpha)) \qquad (12)$$

Where i∈ [M] is picked uniformly at random, α is sampled from $q_\alpha$, and x(i,α) is sampled from the distribution $(x|S_\alpha|s^i)$ with fixed i, α. Accordingly, a random variable $\|c\|_1\text{sgn}(c_\alpha)$ $o(x(i, \alpha))$ is an unbiased estimator of $\xi$ with the variance at most $\|c\|_1^2$. By Hoeffding's inequality, $|\eta-\xi| \leq \xi$ with high probability (at least ⅔).

The decomposition of equation (10) can be computed efficiently in the special case of the Tensor Product noise model. This decomposition is optimal in the sense that $\|c\|_1 = \Gamma$. The resulting distribution $q_\alpha$ and stochastic matrices $S_\alpha$ have a simple product form. This leads to an efficient instantiation of Algorithm 1 that computes a δ-estimate of $\xi$ in time roughly as $$\eta\Gamma^2\delta^{-2} \qquad (13)$$

It is noteworthy that this runtime scales linearly in the number of shots M, as shown in equation (4).

Next, we show how to implement Algorithm 1 in the case when the A-matrix is defined by the CTMP model. As defined previously, G is CTMP generator matrix or model parameter generator matrix, a defined for example in equation (8). We define the quantity $$\gamma = \max_{x \in \{0,1\}^n} -\langle x|G|x\rangle. \qquad (14)$$

The function (x|G|x)can be viewed as a classical Ising-like Hamiltonian with few-spin interactions. Although finding the maximum energy of such Hamiltonians is NP-hard in the worst case, this can be done for moderate system sizes, for example n<50, using heuristic optimizers such as simulated annealing. In the following, we assume that the quantity y has been already computed. First, we note that γ≥0 since G has non-positive diagonal elements, as shown in equations (8,9). We define a matrix B as follows:

$$B = I + \gamma^{-1}G \qquad (15)$$

Using equation (14), we can easily verify that B is a stochastic matrix. Furthermore, $$A^{-1} = e^{-G} = e^\gamma \cdot e^{-\gamma B} = \sum_{\alpha=0}^\infty \frac{e^\gamma(-\gamma)^\alpha}{\alpha!}B^\alpha \equiv \sum_{\alpha=0}^\infty c_\alpha S_\alpha \qquad (16)$$

$$\text{where } S_\alpha = B^\alpha \text{ and } c_\alpha = \frac{e^\gamma(-\gamma)^\alpha}{\alpha!}. \qquad (17)$$

Therefore, $S_\alpha$ is a stochastic matrix for any integer α≥0. Thus Equations (16,17) provide a stochastic decomposition of $A^{-1}$ stated in equation (10).

$$\|c\|_1 = \sum_{\alpha=0}^\infty \frac{e^\gamma \gamma^\alpha}{\alpha!} = e^{2\gamma} \qquad (18)$$

The probability distribution $$q_\alpha = |c_\alpha|/\|c\|_1 = \frac{e^{-\gamma}\gamma^\alpha}{\alpha!} \qquad (19)$$

is the Poisson distribution with the mean γ. If we substitute the decomposition of equations (16, 17) into Algorithm 1, the only non-trivial step of the algorithm is sampling x from the distribution.

$$\langle x|S_\alpha|s^i\rangle = \langle x|B^\alpha|s^i\rangle.$$

This amounts to stimulating a steps of a Markov Chain with the transition matrix B. We note that B is a sparse efficiently computable matrix. More precisely, each column of matrix B has at most w non-zero elements. Therefore, we can simulate a single step of the Markov chain in time roughly w. Since E(α)=γ, simulating a steps of the Markov chain on average takes time roughly w γ. The overall runtime of the Algorithm 1 becomes $$w\gamma\|c\|_1^2\delta^{-2} = \gamma e^{4\gamma}\delta^{-2}$$

MEASUREMENT CALIBRATION: In an embodiment, the measurement calibration attempts to learn parameters of the noise model such as the rates $r_i$ from the experimental data. A single calibration shot initializes n-qubit register in a basis state |x⟩, performs a noisy measurement, and records the measured outcome y. In an embodiment, the calibration is performed for several input states $x^1, \ldots, x^K$. For each input $x^i$ one performs N calibration shots obtaining outputs $y^{i1} \ldots, y^{iN}$. The set of input states may be sufficiently large such that every atomic transition can be activated on some input. Therefore, for any generator $G_p$ there exists at least one input state $x^i$ such that $G_p|x^i\rangle \neq 0$. For concreteness, we assume that only single-bit and two-bit transitions are allowed. A good choice of the input states $\{x^i\}$ is the binary Hamming code. Namely, if p be the smallest integer such that $2^p \geq n$, we choose $K=2^p$ and set $$x_a^i = \sum_{t=1}^{P} \text{bit}(i-1,t) \cdot \text{bit}(a-1,t) \pmod 2.$$

for each a=1, ..., n and i=1, ..., K. Wherein bit(j,t) denotes the t-th bit of an integer j. It can be verified that the restrictions of $x^1, \ldots, x^K$ onto any pair of bits take each value 00, 01, 10, 11 the same number of times. Therefore, calibration based on the input states $\{x^i\}$ probes each generator $G^p$ equally often. For example, if n=7 one can choose K=8 and $x^1$=0000000, $x^5$=1010101
$x^2$=0001111, $x^6$=1011010
$x^3$=0110011, $x^7$=1100110
$x^4$=0111100, $x^8$=1101001

This method uses K<2n input states. For the Tensor Product (TP) noise model we use n+1 input states $x^i$ with the Hamming weight 0 and 1. If we suppose $O_\alpha$ is some diagonal observable, for each input state $x^i$ an empirical mean value can be defined as follows.

$$cal(O_\alpha \mid x^i) = \frac{1}{N} \sum_{j=1}^{N} O_\alpha(y^{ij}).$$

The CTMP model predicts that $y^{ij}$ is sampled from the probability distribution $A|x^i\rangle$. We can compute the mean value of $O_a$ over the distribution $A|x^i\rangle$ by simulating the CTMP using Gillespie algorithm, for example. The simulated mean value is given by the following equation.

$$sim(O_\alpha \mid x^j) = \sum_y O_\alpha(y)\langle y|A|x^i\rangle.$$

Finally, we can define a distance function $D(\vec{r})$ to quantify a discrepancy between the calibration and simulation data as follows $$D(\vec{r}) = \sum_{a=1}^{m} \sum_{i=1}^{K} [cal(O_\alpha \mid x^i) - sim(O_\alpha \mid x^i)]^2. \quad (20)$$

Where $\vec{r} = (r_1, \ldots, r_w)$ is the vector of rates and we fixed a suitable set of observables $\{o_1, \ldots, o_m\}$. The optimal transition rates are found by minimizing the function $D(\vec{r})$ over the domain $\vec{r} \in R_+^w$. Once the optimal rates $r_i$ are computed, one may refine the model by discarding atomic generators $G_i$ with negligible rates $r_i$. The minimization then can be repeated for the refined model. We empirically found that a good choice of the calibration observables $o_\alpha$ is as follows. If $C_1, \ldots, C_w$ is defined as the subset of bits that support atomic transitions of the CTMP model, (equations (8) and (9)), the set of observables $\{o_\alpha\}$ includes all Pauli Z-type operators whose support is contained in some subset $C_i$ as well as the target observable(s) o to be measured.

As it can be appreciated from the above paragraphs, it is also provided a computer readable medium on which is stored non-transitory computer-executable code, which when executed by a classical computer causes a quantum computer to: 1) perform a plurality of quantum measurements on a plurality of qubits having predetermined plurality of states to obtain a plurality of measurement outputs; 2) select a model for a matrix linking the predetermined plurality of states to the plurality of measurement outputs, the model having a plurality of model parameters, wherein a number of the plurality of model parameters grows less than exponentially with a number of the plurality of states; 3) train the plurality of model parameters to minimize a loss function that compares predictions of the model with the matrix; 4) compute an inverse of the model representing an inverse of the matrix based on the trained model parameters; and 5) apply the computed inverse of the model to a noise prone quantum readout of the plurality of qubits of the quantum computer to obtain a substantially noise free quantum readout from the quantum computer.

In an embodiment, the model for the matrix is a Tensor Product (TP) noise model, and the plurality of model parameters include error rates of independent transitions from state 0 to state 1 and probabilities of independent transitions from state 1 to state 0.

In an embodiment, the model for the matrix is such that the matrix is a product of a plurality of qubit matrices, each qubit matrix representing a state of a given qubit j in the plurality of qubits, the matrix being expressed as:

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix},$$

wherein $\epsilon_j$ are error rates describing transition from state 0 to state 1 for qubit j (j=1 ... n), and wherein $\eta_j$ (j=1 ... n) are error rates describing transition from state 1 to state 0 for qubit j (j=1 ... n).

In an embodiment, the model for the matrix is a Continuous Time Markov Process (CTMP) noise model, and the plurality of model parameters include atomic generator elements $G_i$ and transition rates $r_i$, where i represents a qubit i in the plurality of qubits. In an embodiment, the model for the matrix is such that $A=\exp(G)$ wherein model parameter generator matrix G is equal to a sum of products of atomic generator elements $G_i$ by transition time-independent rates $r_i$ over all qubits i as follows:

$$G = \sum_i G_i r_i.$$

In an embodiment, the model approximates the matrix as an exponential of a model parameter generator matrix G, wherein the model parameter generator matrix G is equal to a sum of products of atomic generator elements $G_i$ by transition time-independent rates $r_i$ over all qubits i. The atomic generator elements $G_i$ of the model parameter generator matrix G generates a transition from a bit string $a_i$ to another bit string $b_i$ on a subset of bits $C_i$, wherein $a_i$ and $b_i$ are either state 0 or state 1 of qubit i.

In an embodiment, the inverse of the model representing the inverse of the matrix is equal to the exponential of negative model parameter generator matrix G. In an embodiment, the number of the plurality of model parameters grows linearly with the number of the plurality of states.

In an embodiment, applying the computed inverse of the model to the noise prone quantum readout of the plurality of qubits comprises applying the computed inverse of the model to the noise prone quantum readout of the plurality of qubits to substantially correct the noise prone quantum readout so as to substantially remove noise in the noise prone quantum readout. In an embodiment, training the plurality of model parameters to minimize a loss function that compares predictions of the model with the matrix comprises finding the plurality of model parameters that substantially fit the matrix.

As it can be appreciated from the above paragraphs, it is also provided a conventional (classical) computer configured to execute a non-transitory computer-executable code, the code when executed by the classical computer causes a quantum computer to: 1) perform a plurality of quantum measurements on plurality of qubits having predetermined plurality of states to obtain a plurality of measurement outputs; 2) select a model for a matrix linking the predetermined plurality of states to the plurality of measurement outputs, the model having a plurality of model parameters, wherein a number of the plurality of model parameters grows less than exponentially with a number of the plurality of states; 3) train the plurality of model parameters to minimize a loss function that compares predictions of the model with the matrix; 4) compute an inverse of the model representing an inverse of the matrix based on the trained model parameters; and 5) apply the computed inverse of the model to a noise prone quantum readout of the plurality of qubits of the quantum computer to obtain a substantially noise free quantum readout from the quantum computer.

In an embodiment, the code may be stored in a computer program product which include a computer readable medium or storage medium or media. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. In another embodiment, the code can be downloaded from a remote conventional or classical computer or server via a network such as the internet, an ATM network, a wide area network (WAN) or a local area network. In yet another embodiment, the code can reside in the "cloud" on a server platform, for example. In some embodiments, the code can be embodied as program products in the conventional or classical computer such as a personal computer or server or in a distributed computing environment comprising a plurality of computers that interacts with the quantum computer by sending instructions to and receiving data from the quantum computer.

Generally, the classical or conventional computer provides inputs and receives outputs from the quantum computer. The inputs may include instructions included as part of the code. The outputs may include quantum data results of a computation of the code on the quantum computer.

The classical computer interfaces with the quantum computer via a quantum computer input interface and a quantum computer output interface. The classical computer sends commands or instructions included within code to the quantum computer system via the input and the quantum computer returns outputs of the quantum computation of the code to the classical computer via the output. The classical computer can communicate with the quantum computer wirelessly or via the internet. In an embodiment, the quantum computer can be a quantum computer simulator simulated on a classical computer. For example, the quantum computer simulating the quantum computing simulator can be one and the same as the classical computer. In another embodiment, the quantum computer is a superconducting quantum computer. In an embodiment, the superconducting quantum computer includes one or more quantum circuits (Q chips), each quantum circuit comprises a plurality qubits, one or more quantum gates, measurement devices, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of mitigating quantum readout errors by stochastic matrix inversion, comprising:
    selecting a model for a matrix linking a plurality of quantum states to a plurality of measurement outputs;
    training the model to minimize a loss function that compares predictions of the model with the matrix; and
    apply a computed inverse of the model to a noise prone quantum readout of the plurality of qubits to generate a substantially noise free quantum readout.

2. The method according to claim 1, wherein selecting the model comprises selecting a Tensor Product (TP) noise model, and the plurality of model parameters include error rates of independent transitions from state 0 to state 1 and probabilities of independent transitions from state 1 to state 0.

3. The method according to claim 2, wherein the model for the matrix is such that the matrix is a product of a plurality of qubit matrices, each qubit matrix representing a state of a given qubit j in the plurality of qubits, the matrix being expressed as:

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix},$$

wherein $\epsilon_j$ are error rates describing transition from state 0 to state 1 for qubit j (j=1 . . . n), and
    wherein $\eta_j$ (j=1 . . . n) are error rates describing transition from state 1 to state 0 for qubit j (j=1 . . . n).

4. The method according to claim 1, wherein selecting the model comprises selecting a Continuous Time Markov Process (CTMP) noise model, and the plurality of model parameters include atomic generator elements $G_i$ and transition rates $r_i$, where i represents a qubit i in the plurality of qubits.

5. The method according to claim 4, wherein the model for the matrix A is such that $A = \exp(G)$ wherein model parameter generator matrix G is equal to a sum of products of atomic generator elements $G_i$ by transition time-independent rates $r_i$ over all qubits i as follows:

$$G = \sum_i G_i r_i.$$

6. The method according to claim 5, wherein the atomic generator elements G include:
    element $G_1$ corresponding to a transition from state 0 to state 1 of a first qubit in the plurality of qubits,
    element $G_2$ corresponding to a transition from state 1 to state 0 of the first qubit in the plurality of qubits,
    element $G_3$ corresponding to a transition from state 0 to state 1 of a second qubit in the plurality of qubits, and
    element $G_4$ corresponding to a transition from state 1 to state 0 of the second qubit in the plurality of qubits.

7. The method according to claim 6, wherein the atomic generator elements G further include:
    element $G_5$ corresponding to transition from state 01 to state 11 of neighboring first and second qubits, and
    element $G_6$ corresponding to a transition from state 10 to state 11 of the neighboring first and second qubits.

8. The method according to claim 1,
    wherein the model approximates the matrix as an exponential of a model parameter generator matrix G,
    wherein the model parameter generator matrix G is equal to a sum of products of atomic generator elements $G_i$ by transition time-independent rates $r_i$ over all qubits i,
    wherein the atomic generator elements $G_i$ of the model parameter generator matrix G generates a transition from a bit string $a_i$ to another bit string $b_i$ on a subset of bits $C_i$, wherein $a_i$ and $b_i$ are either state 0 or state 1 of qubit i.

9. The method according to claim 8, wherein computing the inverse of the model representing the inverse of the matrix based on the trained model parameters comprises computing the exponential of negative model parameter generator matrix G.

10. The method according to claim 1, wherein the number of the plurality of model parameters grows linearly with the number of the plurality of states.

11. The method according to claim 1, wherein providing the computed inverse of the model to the noise prone quantum readout of the plurality of qubits comprises applying the computed inverse of the model to the noise prone quantum readout of the plurality of qubits to substantially correct the noise prone quantum readout so as to substantially remove noise in the noise prone quantum readout.

12. The method according to claim 1, further comprising constructing the matrix, the matrix having a plurality of matrix elements, each element of the matrix associates each of the pre-determined states of the plurality of qubits with a corresponding each of the plurality of measurement outputs.

13. The method according to claim 12, wherein the number of the plurality of model parameters grows less than a growth of a number of the plurality of matrix elements.

14. The method according to claim 1, wherein training the plurality of model parameters to minimize a loss function that compares predictions of the model with the matrix comprises finding the plurality of model parameters that substantially fit the matrix.

15. A computer readable medium on which is stored non-transitory computer-executable code, which when executed by a classical computer causes a quantum computer to:
    select a model for a matrix linking a plurality of quantum states to a plurality of measurement outputs;
    train the model to minimize a loss function that compares predictions of the model with the matrix; and
    apply a computed inverse of the model to a noise prone quantum readout of the plurality of qubits to generate a substantially noise free quantum readout.

16. The computer readable medium according to claim 15, wherein the model for the matrix is a Tensor Product (TP) noise model, and the plurality of model parameters include error rates of independent transitions from state 0 to state 1 and probabilities of independent transitions from state 1 to state 0.

17. The computer readable medium according to claim 16, wherein the model for the matrix is such that the matrix is a product of a plurality of qubit matrices, each qubit matrix representing a state of a given qubit j in the plurality of qubits, the matrix being expressed as:

$$A = \begin{bmatrix} 1-\epsilon_1 & \eta_1 \\ \epsilon_1 & 1-\eta_1 \end{bmatrix} \otimes \ldots \otimes \begin{bmatrix} 1-\epsilon_n & \eta_n \\ \epsilon_n & 1-\eta_n \end{bmatrix},$$

wherein $\epsilon_j$ are error rates describing transition from state 0 to state 1 for qubit j (j=1 ... n), and
wherein $\eta_j$ (j=1 ... n) are error rates describing transition from state 1 to state 0 for qubit j (j=1 ... n).

18. The computer readable medium according to claim 16, wherein the model for the matrix is a Continuous Time Markov Process (CTMP) noise model, and the plurality of model parameters include atomic generator elements $G_i$ and transition rates $r_i$, where i represents a qubit i in the plurality of qubits.

19. The computer readable medium according to claim 18, wherein the model for the matrix is such that $A = \exp(G)$ wherein model parameter generator matrix G is equal to a sum of products of atomic generator elements $G_i$ by transition time-independent rates $r_i$ over all qubits i as follows:

$$G = \sum_i G_i r_i.$$

20. The computer readable medium according to claim 15,
    wherein the model approximates the matrix as an exponential of a model parameter generator matrix G,
    wherein the model parameter generator matrix G is equal to a sum of products of atomic generator elements $G_i$ by transition time-independent rates $r_i$ over all qubits i,
    wherein the atomic generator elements $G_i$ of the model parameter generator matrix G generates a transition from a bit string $a_i$ to another bit string $b_i$ on a subset of bits $C_i$, wherein $a_i$ and $b_i$ are either state 0 or state 1 of qubit i.

21. The computer readable medium according to claim 20, wherein the inverse of the model representing the inverse of the matrix is equal to the exponential of negative model parameter generator matrix G.

22. The computer readable medium according to claim 15, wherein the number of the plurality of model parameters grows linearly with the number of the plurality of states.

23. The computer readable medium according to claim 15, wherein applying the computed inverse of the model to the noise prone quantum readout of the plurality of qubits comprises applying the computed inverse of the model to the noise prone quantum readout of the plurality of qubits to substantially correct the noise prone quantum readout so as to substantially remove noise in the noise prone quantum readout.

24. The computer readable medium according to claim 1, wherein training the plurality of model parameters to minimize a loss function that compares predictions of the model with the matrix comprises finding the plurality of model parameters that substantially fit the matrix.

25. A classical computer configured to execute a non-transitory computer-executable code, the code when executed by the classical computer causes a quantum computer to:
   select a model for a matrix linking a plurality of quantum states to a plurality of measurement outputs;
   train the model to minimize a loss function that compares predictions of the model with the matrix; and
   apply a computed inverse of the model to a noise prone quantum readout of the plurality of qubits to generate a substantially noise free quantum readout.

* * * * *